Sept. 28, 1954   N. P. BEDSON   2,690,220
ROTARY FLYING SHEAR MECHANISM
Filed Aug. 2, 1950
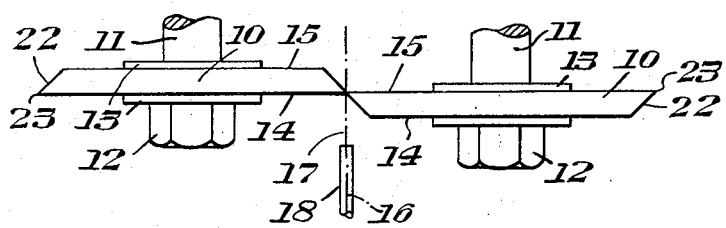
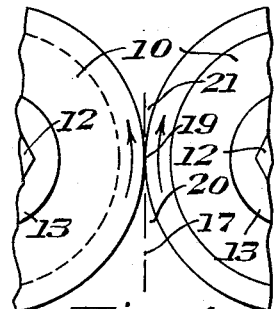
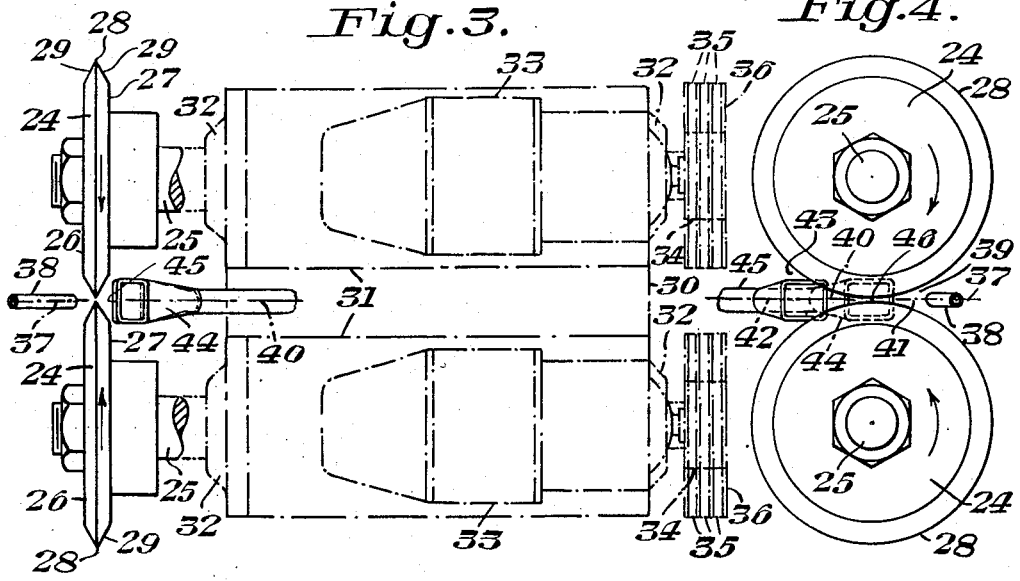
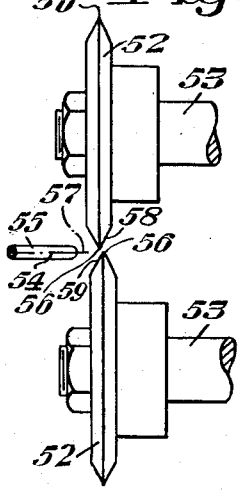
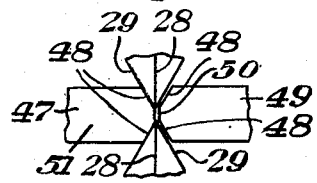
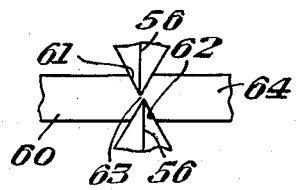
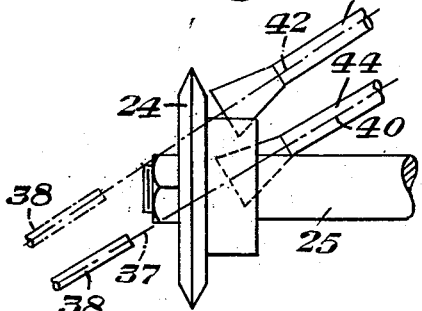
INVENTOR
NOEL P. BEDSON, DECEASED,
ELSIE BEDSON, EXECUTRIX

UNITED STATES PATENT OFFICE 2,690,220

ROTARY FLYING SHEAR MECHANISM

Noel Phillips Bedson, deceased, late of Southport, England, by Elsie Bedson, executrix, Southport, England, assignor, by mesne assignments, to Blaw-Knox Company, Pittsburgh, Pa., a corporation of Delaware Application August 2, 1950, Serial No. 177,222

1 Claim. (Cl. 164—61)

This invention relates to novel rotating knives and the effect thereof when used in a rotary flying shear unit. More particularly, it relates to the provision of such knives having parting edges intermediate the faces thereof to part the metal stock without completely cutting through it and propel the forward parted portion to the desired collecting point.

Conventional rotary flying shear units used, for example, in rod rolling mills or the like, employ circular knives positioned on opposite sides of the shearing plane in which the pass line is swung when a cut is to be made. These knives are mounted on shafts or spindles which may be placed at an angle of about 30° to the direction of travel of a rod or the like along the pass line. Further, the knives rotate in opposite directions so as to draw the metal stock into the bite or nip of the knives and effect a complete shearing thereof in a fraction of a second while the rod continues to move. The knives used in such shear mechanism are usually circular discs having substantially planar front and back faces and a conical edge. The knives are so mounted on the shafts that the respective faces of larger diameter substantially lie in the same plane with the circumferential corner element around the base of the conical edge either alongside one another or the axes of the knives are moved closer so that such elements slightly overlap across the shearing plane. Such knives in rotary flying shear units are illustrated in United States Patents Nos. 1,513,070 and 2,170,255.

In the present invention, a new kind of shearing knife is provided in which a circumferential parting edge is provided intermediate the front and rear faces of the knives. Moreover, these knives are separated at all times and avoid the necessity of cutting completely through the metal stock to be sheared or cut. Still further, the new knives project the parted portion of the metal stock on their far side along the pass line with considerable velocity.

Other objects and advantages of this invention will be apparent from the following description and from the drawings which are illustrative only, in which Figure 1 is a view taken along the shearing plane of conventional knives in a standard rotary flying shear unit;

Figure 2 is a partial view of the construction shown in Figure 1 looking at the said knives in the direction the axes thereof extend;

Figure 3 is a view of a preferred embodiment of this invention taken along a shearing plane and edgewise to the new knives;

Figure 4 is a view of the embodiment shown in Figure 3 taken along the shear plane in the direction the axes of said knives extend;

Figure 5 is a view of the embodiment shown in Figures 3 and 4 taken at right angles to both thereof;

Figure 6 is an enlarged diagrammatic view of a parting of metal stock effected by the embodiment shown in Figures 3 to 5;

Figure 7 is a view of a modified embodiment of this invention taken along the shearing plane and edgewise to the new knives; and Figure 8 is an enlarged diagrammatic view of a parting of metal stock about to be effected by the modified embodiment shown in Figure 7.

Conventional knives 10 for a standard rotary flying shears unit are illustrated in Figures 1 and 2. Each knife is coaxially mounted on a shaft or spindle 11 to which it is secured by a nut 12. Spacing washers 13 may also be used to assist in positioning the knife which is suitably keyed to its respective shaft 11. Each knife 10 comprises a near or front face 14 and a far or rear face 15 relative to a pass line 16 for a rod or the like lying within a shearing plane 17 normal to a plane containing the axes of the respective parallel shafts 11. A switch pipe 18 is adapted by conventional means as is well understood in the art to swing in shear plane 17 through the tangency sector of the respective knives 10 which forms the nip or bite thereof. The direction of rotation of the knives to draw the metal stock to be sheared into the bite 19 may be as illustrated in Figure 2.

Because pass line 16 usually forms an acute angle with the plane defined by and containing the axes of the shafts 11, a rod or the like moving along pass line 16 will be completely sheared by the knives 10 while the rod continues to move, the cut portion on the far side of the knives passing along a continuation of the pass line on the approach side 20 of the bite 19 and the remainder of the rod passing along a continuation of the pass line on the delivery side 21 of the bite 19.

Such conventional knives 10 are usually provided with a conical edge 22 tapering in each case outwardly from the face away from the other knife to a plane defined by the far face 15 of knife 10 on the right-hand side of Figure 1 and by the near face 14 of the knife 10 on the left-hand side of Figure 1. These faces being the ones respectively of larger diameter remain tangent to each other on shearing plane 17 as the circumferential base corner element 23 of each conical edge 22 is revolved. Sometimes the base corner elements 23, instead of being tangent to each other on shearing planes 17, overlap along the plane generally defined by the respective faces of larger diameter of the respective knives 10. In this last-mentioned situation, the axes of the shafts 11 are closer than the sum of the respective radii of the said larger faces of the respective knives.

In such prior practice the metal stock moving along the pass line is completely cut or sheared by the passage therethrough of the knives which are provided with minimum clearance between them. Moreover, the sheared portion of the metal stock on the far side of the knives may lose substantially all of the forward component of motion which it had and thereby may fail to reach its desired station or collecting point along the continuation of the pass line.

In a preferred embodiment of this invention shown in Figures 3 to 5, a new kind of knife 24 is employed in pairs mounted in conventional manner, usually on parallel shafts or spindles 25. These knives are circular discs having front or near faces 26 and rear or far faces 27. Intermediate such faces a circumferential parting edge 28 is provided generally lying in a plane normal to the axis of the respective shaft 25 on which the knife 24 is mounted. A bezel 29 slopes inwardly from each parting edge 28 on each side thereof to the respective faces of the knife. Thus, each parting edge 28 with its bezels forms a double bevel edge, the included acute angle between the sides of which bevel edge may be about 60°.

As schematically shown in Figure 3, a housing 30 supports the respective barrels 31 and bearings 32 for each shaft 25. A motor 33 is adjustably mounted on a plate pivotally fastened to the side of housing 30 adjacent each shaft 25. The shaft of each motor 33 is provided with a drive pulley 34 which, by means of belts 35, drives a driven pulley 36 keyed to the rearmost end of each shaft 25.

A pass line 37 for rods or the like passes through a switch pipe 38 which normally is positioned in the approach cusp 39 of the knives 24. In that position, the pass line 37 is continued by the pass line 40 on the far or back side of the knives 24. When, however, switch pipe 38 is swung in parting plane 41 to the position as shown in Figure 5 in dot-and-dash outline, to force the pass line to the other side of the line joining the centers of the respective knives, the pass line 37 is then continued by pass line 42 extending through the delivery cusp 43 of the knives 24. For each of the continuation pass lines 40 and 42, fixed guide pipes 44 and 45 respectively are provided with suitable bell mouths to catch the ends of the respective portions of the rod or the like as they appear on the far side of the knives in a manner well understood in the art.

In this invention, as illustrated in Figures 3 to 6, the parting edges 28 of the pair of knives 24 lie in a single plane, the axes of those knives being separated by a distance greater than the sum of the respective radii thereof. At the same time, at the point 46 where the knives most nearly approach each other, the distance between the parting edges 28 is less than the dimension of the metal stock to be cut measured in the same direction as a line connecting the respective centers of those knives. As seen in Figs. 3 and 6, the distance between the cutting edges of the knives is less than the radius of said rod.

The effect of the use of such an embodiment may be illustrated by reference to Figure 6. In that figure, it may be assumed that a rod 47 is passing along rod line 37. At the precise place where the rod is to be parted, switch pipe 38 is swung so as to move the pass line from zone 39 to zone 43 through the point 46. As soon as rod 47 touches the parting edges 28, due to their direction of rotation as shown in the figures, the knives 24 will tend to force rod 47 through point 46. In so doing, the double bevel edges will cut in the rod two aligned V-shaped grooves, or, an annular groove if the rod rotates, having the sides 48. In the course of this cutting, the sloping sides 29 of the knives will create a wedging action against the sides 48 putting the rod 47 under tension over the reduced or necked portion 50 thereof at the base of the cut. Such wedging and tension will become sufficient in the course of the cutting by the knives 24 to complete the severance of the respective portions 49 and 51 across the neck portion 50.

At the same time, the forward portion 49 of the rod 47 on the far side of the knives 24 will be projected or propelled forwardly along pass line 48 with considerable force. Thus, portion 49 is materially assisted in reaching its desired station for further movement or collection. The purely diagrammatic illustration in Figure 6 shows portion 49 after the tension has become such as to break the "neck" or reduced section across the base of the groove defined by the sloping sides 48 in the rod 47.

Further, the peripheral speed of the parting edges 28 will be usually greatly in excess of the components of movement of rods or the like along the pass line on the near side of the knives 24. The axes of the shafts 25 may lie in a plane forming an acute angle of 30°, for example, with the pass line 37 before the swinging of switch pipe 38 into the dot-and-dash position shown in Figure 5. Therefore, such rods as rod 47 or the like are effectively partially cut and the parting completed by breaking, while continuing their forward travel without any retardation of the motion of the rod or portions thereof.

Moreover, inasmuch as the parting edges 28 of the knives 24 are never closer than, for example, one thirty-second of an inch at point 46, no alignment or wear problem can arise with likelihood of the rubbing or wearing against one another. Further, the precise alignment of the respective parting edges 28 within a single plane is not critical in the parting of rods in accordance with this invention. These apices or parting edges 28 in practice in accordance with the embodiment illustrated in Figures 3 to 5, will not be located a distance apart greater than that sufficient to complete the parting by the wedging action of the respective bezels 29.

In a modified embodiment of this invention shown in Figures 7 and 8, a pair of double bevel edge knives 52 are employed and are conventionally mounted on shafts 53 similar to shafts 25. A pass line 54 passes through a switch pipe 55 similar in construction and operation to switch pipe 38. However, in this modified embodiment, the knives are offset or separated longitudinally in an axial direction. The amount of longitudinal offset is usually less than one-half the distance between the respective faces of either knife 52. In addition, the distance between the bezel 58 on the far side of the upper knife 52 in Figure 7 and the bezel 59 on the near side of the lower knife 52 in Figure 7 is less than the diameter or dimension of the metal stock to be parted measured in the direction of the plane containing the axes of the shafts 53.

In operation, as diagrammatically shown in Figure 8, this modified embodiment produces a partial cutting of a rod 60 or the like by each of the parting edges 56 which cutting will be in the form of conical annular grooves if there is substantial rotation of the rod during cutting. Otherwise, the respective parting edges 56 and bezels on each side thereof, will produce the respective V-shaped grooves 61 and 62. These grooves will be connected by a reduced section 63 as the rod 60 passes through the plane containing the axes of the knives 52 and their shafts 53. Again, the respective bezels connecting the parting edges 56 with the front and back faces of the knives 52 exert a wedging action which in the course of the swing of switch pipe 55 in the shearing plane 57 from the approach to the delivery side of the knives will put section 63 under such tensile stress as to break it and project the foremost portion 64 along the continuation of the pass line 54 on the approach side of the knives 52.

Although the foregoing embodiments of this invention are described in connection with a rotary flying shears unit in which the knife shafts are parallel and the distance between such shafts fixed, this invention may also be used with those rotary flying shear mechanisms in which the respective shafts are provided with eccentric movements relative to each other. Further, this invention will normally be used with shear mechanisms in which the shafts for rotating the parting knives are parallel. However, in some cases, such shafts may be set at an angle to each other without material detriment to the results which can be obtained by the practice of this invention. Still further, although the parting knives shown in Figures 3 to 8 are provided with symmetrical parting edges and bezels, the parting edge on such knives may in some cases be located closer to one face than to the other. Other modifications may also be made which are within the spirit of this invention as defined by the scope of the following claim.

What is claimed is:

In combination, in a rod rolling mill having a pass line along which a rod moves, a rotary flying shear unit comprising a pair of rotatable shafts, a frame in which said shafts are mounted, disc knives mounted on said shafts, the axes of said knives being substantially stationary while said knives engage and part a rod passing along said pass line, a line joining the centers of said knives being adjacent said pass line, means for laterally moving a rod passing along said pass line to the other side of said line joining said centers to part said rod, each of said knives having a circumferential parting edge and being beveled radially inwardly on each side of said edge to form a generally symmetrical radial acute included angle taper to said edge which acute included angle may be about 60°, the respective parting edges being generally in alignment and having an oblique position relative to said pass line, said parting edges being separated by a distance during said parting of said rod less than the radius of said rod, and means for rotating said knives in opposite directions at least during said engagement and parting at a linear speed greater than the linear speed of a rod passing along said rod line, the direction of movement of said knives adjacent the plane of movement of the pass line having a velocity component in the direction of movement of a rod along said pass line.

References Cited in the file of this patent

UNITED STATES PATENTS

| Number | Name | Date |
|---|---|---|
| 897,142 | Preston | Aug. 25, 1908 |
| 1,366,063 | Culhane | Jan. 18, 1921 |
| 1,513,070 | Rendleman | Oct. 28, 1924 |
| 2,170,255 | Shepherdson | Aug. 22, 1939 |

FOREIGN PATENTS

| Number | Country | Date |
|---|---|---|
| 446 | Italy | Aug. 26, 1875 |
| 518,628 | Germany | Aug. 2, 1931 |
| 425,900 | Great Britain | Mar. 15, 1935 |
| 9,267 | Great Britain | May 19, 1900 |